United States Patent [19]

Eldumiati et al.

[11] Patent Number: 4,761,732
[45] Date of Patent: Aug. 2, 1988

[54] INTERRUPT CONTROLLER ARRANGEMENT FOR MUTUALLY EXCLUSIVE INTERRUPT SIGNALS IN DATA PROCESSING SYSTEMS

[75] Inventors: Ismail I. Eldumiati, Holmdel, N.J.; David T. Melnik, Rehovot, Israel; Robert P. Wiederhold, Millburn, N.J.

[73] Assignee: American Telephone and Telegraph Company, AT&T Bell Laboratories, Murray Hill, N.J.

[21] Appl. No.: 802,988

[22] Filed: Nov. 29, 1985

[51] Int. Cl.⁴ .............................................. G60F 9/46
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,665,415 | 5/1972 | Beard et al. | 364/200 |
| 3,905,025 | 9/1975 | Davis et al. | 364/200 |
| 4,023,143 | 5/1977 | Braunstein | 364/200 |
| 4,091,447 | 5/1978 | Dillon et al. | 364/200 |
| 4,124,892 | 11/1978 | Jones et al. | 364/900 |
| 4,130,865 | 12/1978 | Heart et al. | 364/200 |
| 4,151,598 | 4/1979 | Webster | 364/900 |
| 4,152,761 | 5/1979 | Louie | 364/200 |
| 4,237,535 | 12/1980 | Wiedenman | 364/200 |
| 4,349,872 | 9/1982 | Fukasawa et al. | 364/200 |
| 4,377,853 | 3/1983 | Dockal | 364/900 |
| 4,410,939 | 10/1983 | Kawakami | 364/200 |
| 4,420,806 | 12/1983 | Johnson, Jr. et al. | 364/200 |
| 4,438,492 | 3/1984 | Harmon, Jr. et al. | 364/200 |
| 4,470,111 | 9/1984 | Jenkins et al. | 364/200 |
| 4,523,277 | 6/1985 | Schnathorst | 364/200 |
| 4,630,041 | 12/1986 | Casamatta et al. | 364/200 |
| 4,636,944 | 1/1987 | Hodge | 364/200 |
| 4,644,465 | 2/1987 | Imamura | 364/200 |

Primary Examiner—Raulfe B. Zache
Assistant Examiner—Danh Thanh Phung
Attorney, Agent, or Firm—David I. Caplan; Jerry W. Herndon

[57] ABSTRACT

An interrupt controller circuit arrangement is used for encoding and storing "interrupt" signals indicating random (asynchronous) occurrence of corresponding events and for delivering corresponding "interrupt" (alarm command) signals to a (synchronous) microprocessor corresponding to the events as they occur. The events are divided into two (or more) sets in order to reduce the required number of latches and to increase the speed of operation. One (or more) of these sets consists of events which never can occur "simultaneously" (i.e., which are mutually exclusive in the sense that (within each of such sets) not more than a single one of the events can occur—and can occur only once—within a prescribed amount of time); the remaining set consists of the remaining events—i.e., those which can occur "simultaneously" or can occur simultaneously with one or more of those in the other set(s). In this way only the interrupt signals indicating the occurrence of events in the remaining set need be individually latched in separate latches each of which is devoted to a separate one of the events in that set.

7 Claims, 2 Drawing Sheets

INTERRUPT CONTROLLER ARRANGEMENT FOR MUTUALLY EXCLUSIVE INTERRUPT SIGNALS IN DATA PROCESSING SYSTEMS

FIELD OF THE INVENTION

This invention relates to an electronic data processing system and more particularly to a data processing system in which a multiplicity of different interrupt signals are generated asynchronously, each such interrupt signal being generated in response to an occurrence of an event corresponding to the interrupt signal. The purpose and function of each such interrupt signal is, for example, to cause a target synchronous data processing machine, such as a microprocessor, to execute a preselected computer-type instruction corresponding to the event--each such event occurring, typically at random, in parts of the system external to the target synchronous machine.

BACKGROUND OF THE INVENTION

In a variety of data processing contexts a number of different interrupt signals $I_1, I_2, \ldots$ are generated at various times during operation, the generation of each interrupt signal signifying an occurrence of the event corresponding to the interrupt signal. Thus, if and when, say, the i'the event occurs, then the i'th interrupt signal $I_i$ is generated. Each event can in general occur at random (asynchronously), and when each such event occurs it signifies that certain computer-type action should be taken corresponding to the event, i.e., signifies that a corresponding computer-type instruction should be executed, as by a synchronous microprocessor. Typically, the microprocessor is integrated in a signle semiconductor circuit chip, and the interrupt signals are generated in other circuit chips.

In such data processing systems, more than a single event ean occur essentially simultaneously, and hence more than a single interrupt signal can be generated at once. Moreover, on occasion the events occur so rapidly one after the other that the corresponding interrupt signals are generated so rapidly that, if the interrupt signals are delivered directly to the target machine, then the target synchronous machine cannot execute the corresponding instructions fast enough to keep up with the events. Therefore, it becomes necessary to have an interrupt controller arrangement, i.e, means for temporarily storing, as by queuing, the different incoming interrupt signals before delivering them to the target synchronous machine (typically a microprocessor).

In prior art, an interrupt controller arrangement, for thus temporarily storing the interrupt signals $I_1, I_2, I_3, \ldots$, typically involves the use of an array of latches $L_1, L_2, L_3, \ldots$. The arrival of interrupt signal $I_i$ sets the corresponding latch $L_i$ to logic "high", i.e., to binary digital "1", for recording and storing the information as to the arrival of the interrupt signal. Each such latch is reset to "0" immediately after readout of the latch. Each of the latches thus temporarily stores a single bit $B_1, B_2, B_3, \ldots$ corresponding to whether or not the corresponding interrupt signal $I_1, I_2, I_3, \ldots$ has been generated since the previous time the latch had been accessed for readout. Thus, for example, when the i'th event occurs, the i'th interrupt signal $I_i$ is generated and arrives at the i'th latch $L_i$, whereby the i'th latch is set--i.e., the state of the i'th bit $B_i$ becomes a binary digital "1"; and when the i'th latch $L_i$ is accessed for readout, it is reset to "0"--i.e., the i'th bit $B_i$ becomes "0". The array of latches is scanned periodically, e.g., once during every time period T, so that each of the latches is accessed for readout, one after another in sequence, and is immediately thereafter reset to "0", once and only once during every such period. This period T, the scanning period, typically is selected to be sufficiently short so that no event occurs twice during any period. Alternatively, the second occurrence of an event during a given period is not considered meaningful, because it is not effective in changing the state of the corresponding latch (and hence it ultimately is not effective in commanding the target synchronous machine to execute the corresponding instructions a corresponding second time). Accordingly, it will be assumed that the period T is selected to be short enough that no event occurs twice within any such period, or that the second occurrence of the event is considered as not meaningful. As a further alternative, a second latch can be supplied for an event that can occur twice within any period T. In any case, when a given latch $L_i$ is accessed for readout, the latch $L_i$ enables or does not enable--depending upon whether it is then set (to "1") or reset (to "0")--a memory stack to be written with an encoded interrupt word (string of bits) $W_i$ corresponding to the latch $L_i$ and hence corresponding to the i'th event. Thus different encoded words $W_i$ are written or not written in the memory stack depending upon whether the bit $B_i$ is then a "1" or a "0". Typically the memory stack is a FIFO (first in, first out) memory stack. In any case, after each latch is thus accessed for readout it is reset to "0", the stored bit $B_i$ therein is "0", and the latch $L_i$ retains this "0" until the corresponding interrupt signal $I_i$ once again is generated and arrives at this latch. Finally, the memory stack stores in a queue each of the encoded interrupt words $W_i$ thus written into it and delivers each of these words $W_i$ in sequence--typically first in, first out--to the target synchronous machine, one word for each synchronous timing cycle of the machine. Note that each machine cycle and each scanning period T in general are independent of each other, i.e., have no correlation.

A serious problem that arises in using such an interrupt controller arrangement is the requirement of a separate latch for each interrupt signal, i.e., a separate latch for recording and temporarily storing the occurrences of each event. Thus if there are n different events, typically as many as 50 or more, there are n different interrupt signals $I_i$, and hence there must be n different latches $L_i$ and n separate access time intervals constituting each scanning period T. Thus, for an access time t, the period T must be as long as at least nt in duration. It would therefore be desirable to have an arrangement in which the required number of latches are significantly reduced, whereby the scanning period T can be correspondingly reduced.

SUMMARY TO THE INVENTION

In order to reduce the number of latches in an electronic data processing system, as well as to increase the operating speed, in one embodiment of the invention an interrupt controller is designed to handle interrupt signals that are divided into two separate sets, one of the sets consisting of mutually exclusive interrupt signals generated by mutually exclusive events, M in number, and the other of the sets containing the remaining interrupt signals generated by the remaining events, N in number, for a total of n=(M+N) possible different events. By "a set of mutually exclusive events" it is meant that all the occurrences of all the events within this set are mutually separated in time by at least a prescribed minimum amount of time s. The set of "remaining events" thus in general include "coincident" events--i.e., events which may occur within the same time interval s as one or more of the events in the set of mutually exclusive events, or which are not guaranteed to be mutually spaced apart in time by the prescribed amount of time s, or both. For convenience, if any event in a set is thus coincident with any other, then all events in the set are considered to be "coincident". Whenever any one of the mutually exclusive or any one of the remaining events occurs, a corresponding interrupt signal is generated, a different such interrupt for each different event. Thus the interrupt signals generated by the events are similarly divided into two sets: one set consisting of M mutually exclusive interrupt signals $E_1$, $E_2, \ldots E_M$--i.e., interrupt signals characterized in that at most only one of them can be generated, and can be generated only once, within any time interval of a prescribed length s--the remaining set consisting of N non-mutually exclusive ("co-incident") interrupt signals $C_1$, $C_2, \ldots C_N$--i.e., interrupt signals characterized in that more than one of them may be generated within a time interval of the prescribed length s, or in that one or more of them may be generated within the same time interval s as one or more of them interrupt signals in the mutually exclusive set, although the same signal in this remaining set may not be generated more than once within any time interval equal to Ns or less.

The interrupt controller arrangement itself includes a first encoder, such as a ROM (read only memory) array or a PLA (programmed logic array), suitable for encoding each of the mutually exclusive interrupt signals $E_1$, $E_2, \ldots E_M$ into a separate corresponding encoded interrupt word $W_1, W_2, \ldots W_M$--a different word for each of the mutually exclusive events. This first encoder is connected for receiving the mutually exclusive interrupt signals $E_1, E_2, \ldots E_M$ and thus encoding them into the interrupt words $W_1, W_2, \ldots W_M$. A multiplexer is connected for periodically receiving ("sampling") from this first encoder whatever word is there encoded--one such word thereby being received during each period t, where t is selected to be less than or equal to s.

The interrupt controller arrangement further includes a second encoder for encoding the remaining set, of non-mutually exclusive interrupt signals, $C_1, C_2, \ldots C_N$, into encoded words $w_1, w_2, \ldots W_N$, and for delivering each of these words, one after the other in sequence, to the multiplexer, one such word per time period t, as determined by a ring counter. Thus it takes a time interval equal to Nt for all words in this remaining set to be delivered once to the multiplexer.

The multiplexer is arranged to receive ("sample") and deliver per period t one word from the first encoder plus one word from the second encoder to a memory stack, such as a FIFO memory stack. However, not all words being received by the multiplexer are to be written into the memory stack, because some of these words may not have been received since the last time each of such words were written into the stack. For example, the mutually exclusive word $W_i$ that is in the first encoder and is being delivered to the multiplexer during the present period t may have been retained by the encoder from a previous period t when the corresponding interrupt signal $E_i$ was generated, but no new mutually exclusive interrupt signal has been generated since that time and hence the present word $W_i$ is spurious. Moreover, the non-mutually exclusive words, in one embodiment, are delivered to the multiplexer in sequence regardless of whether or not the corresponding interrupt signals have been generated. Thus, a write logic unit--including an array of N latches $L_1, L_2, \ldots L_N$ for recording the occurrences of the non-mutually exclusive interrupt signals $C_1, C_2, \ldots C_N$--is advantageously connected into the interrupt controller arrangement in order to enable the writing into the memory stack of each word as it is being received if and only if the corresponding interrupt signal has actually been generated since the last occasion on which the same interrupt signal (corresponding to that same word) was generated and hence when such word was written into the memory stack. This memory stack is arranged to deliver to a target synchronous machine, such as a synchronous microprocessor, just one word per synchronous machine cycle.

Notice that since there are only N latches that are required in the write logic unit, rather than N+M latches as in prior art, there is a saving of M latches in this embodiment. Moreover the scanning period T is thus equal to only Nt, instead of (N+M)t as in prior art.

In other embodiments of the invention, the events are further subdivided such that there is more than a single set of mutually exclusive events, now in the sense that not more than a single event within each set can occur (and then only once) per scanning period T, whereby the number of non-mutually exclusive (coincident) events, and hence the number of corresponding different coincident interrupt signals, can be reduced by transferring some of them out of the coincident set and placing each of them into one or another of the mutually exclusive sets where each of these interrupt signals is mutually exclusive with respect to the others in the set into which it is transferred. In such cases—i.e., of multiple sets of mutually exclusive events--the encoded words corresponding to the occurrences of the mutually exclusive events may not be valid long enough while waiting to be received by the multiplexer and therefore these words are advantageously temporarily stored in registers--only one such register being required per set of mutually exclusive events. In such an embodiment of multiple sets of mutually exclusive events, the multiplexer is arranged, for example, to receive (to "sample") in succession all words in the coincident set, a single word from a first set of mutually exclusive interrupt signals, and a single word from a second set of mutually exclusive interrupt signals.

BRIEF DESCRIPTION OF THE DRAWING

This invention together with its features, advantages, and characteristics may be better understood from the following detailed description when read in conjunction with the drawing in which.

DETAILED DESCRIPTION

Figure 1:
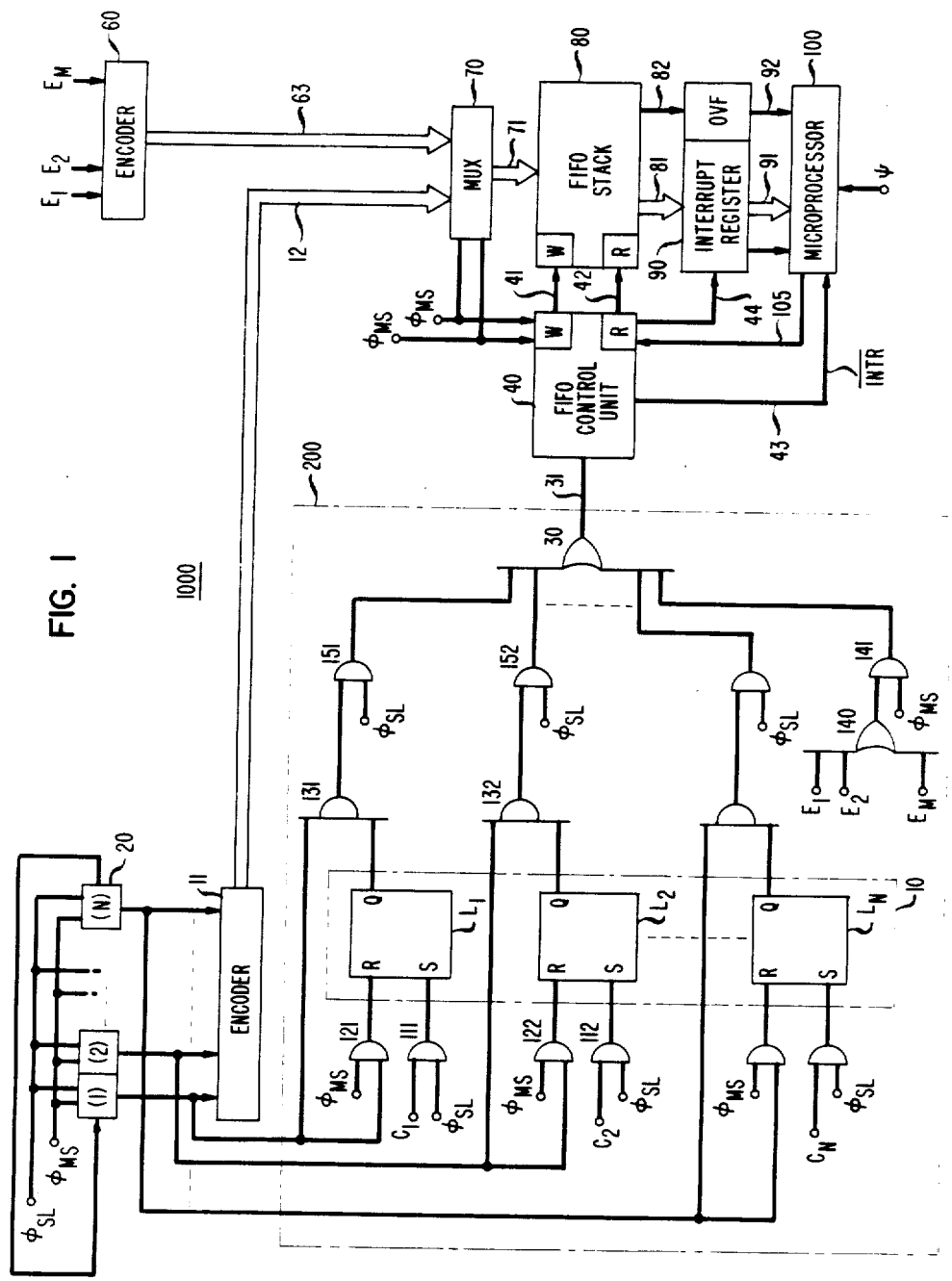
FIG. 1 is a diagram of an interrupt controller arrangement in accordance with a specific embodiment of the invention.

FIG. 1 shows an interrupt controller arrangement 1000 in a data processing system (not shown) for controlling delivery of mutually exclusive interrupt signals $E_1, E_2, \ldots E_M$ and of coincident interrupt signals $C_1, C_2, \ldots C_N$ to a microprocessor 100. The signals $E_1, E_2, \ldots E_N$ and $C_1, C_2, \ldots C_N$ are generated by other parts (not shown) of the data processing system.

The controller arrangement includes a modulo-N ring counter 20, a first encoder 60, a second encoder 11, an array 10 of R-S latches $(L_1, L_2, \ldots L_N)$, a multiplexer 70, a FIFO Control Unit 40, a FIFO Stack 80, a FIFO Write Logic Unit 200, and an interrupt register 90. The modulo-N ring counter 20 contains N stages labeled (1), (2), . . . (N) and is timed by master and slave clock pulse sequences $\phi_{MS}$ and $\phi_{SL}$, each having a periodicity equal to t. This counter 20 is connected for delivering its respective (sequential) outputs of stages (1), (2), . . . (N) to the encoder 11 as well as to the respective terminals R of the R-S latches $L_1, L_2, \ldots L_N$ via AND gates 121, 122, . . . respectively. Each of these AND gates 121, 122, . . . is also connected for receiving a master clock pulse sequence $\phi_{MS}$ in order to gate the counter with the master sequence. That is, if and only if the master clock is "high" (logic "1") and at the same time the i'th stage of the counter 20 is also "high", then the i'th latch $L_i$ in the array 10 is reset (Q=0) by the ring counter via the corresponding one of these AND gates. As known in the art, one and only one stage of the ring counter 20 delivers a "high" logic level at a time, one stage after the other; hence the latches $L_1, L_2, \ldots L_N$ are successively reset, one after the other, during successive "high" phases of the master clock $\phi_{MS}$.

The FIFO Write Logic 200 is connected for delivering its output along a datum line 31 to the FIFO Control Unit 40. This Write Logic 200 comprises an array 10 of R-S latches $L_1, L_2, \ldots L_N$ connected for receiving, at their respective Set terminals S, the coincident interrupt signals $C_1, C_2, \ldots C_N$, respectively, via AND gates 111, 112, . . . respectively. Each of these AND gates 111, 112, . . . is also connected for receiving a slave clock pulse sequence $\phi_{SL}$. As known in the art, whenever the master clock goes "high" the slave is "low", and whenever the slave goes "high" the master is "low", so that only during a slave phase (when the slave clock is "high") can the latches $L_1, L_2, \ldots L_N$ be set (Q=1) by a corresponding signal $C_1, C_2, \ldots C_N$ delivered through the corresponding AND gate 111, 112, . . . to the corresponding Set terminal S of $L_i$.

The write logic 200 further comprises an M-input OR gate 140 connected for receiving the exclusive interrupt signals $E_1, E_2, \ldots E_M$ and for delivering its output to the OR gate 30 via an AND gate 141. It is important that each of these signals $E_1, E_2, \ldots E_M$ is valid during the master phase of the clock, i.e., when the master clock $\phi_{MS}$ is "high", and more particularly at the corresponding moment during each such master phase when the multiplexer 70 samples the data arriving on data bus 63 from the first encoder 60, as described more fully below. This AND gate 141 is also connected for receiving the master clock pulse sequence $\phi_{MS}$, in order to ensure proper timing of the delivery of any of the exclusive interrupt signals (as output of the OR gate 140) to the OR gate 30 relative to the timing of the delivery of the corresponding encoded words from the encoder 60 to the FIFO Stack 80 via the multiplexer 70, as described more fully below.

The write logic 200 still further comprises an (N+1)-input OR gate 30 connected for receiving all the outputs Q of the R-S latches $L_1, L_2, \ldots L_N$ via AND gates 131, 132, 133, . . . , respectively. This OR gate 30 is further connected for delivering its output along an interconnecting line 31 to the FIFO Control Unit 40, in particular to a Write Control terminal W of the FIFO Control Unit 40.

The other encoder 60 is connected for receiving the mutually exclusive interrupt signals $E_1, E_2, \ldots E_M$. The encoders 11 and 60 are connected so as to deliver their respective output words along data buses 12 and 63, respectively, to the multiplexer 70.

The multiplexer 70 is connected so as to deliver its output along a data bus 71 to the FIFO Stack 80. The multiplexer 70 is controlled by the master and the slave clock sequences $\phi_{MS}$ and $\phi_{SL}$, and it alternately samples the data in the bus 12 and the data in the bus 63, whereby its output delivered to the data bus 71 is selected alternately to be the data in the data bus 12 during a pre-selected time slot or edge (as the case may be) within each "high" phase of the slave clock sequence $\phi_{SL}$ and the data in the data bus 63 during a pre-selected time slot or edge within each "high" phase of the master clock sequence $\phi_{MS}$. The data bus 71 is arranged to carry not only the data alternately from the buses 12 and 63 but also carries an added bit of data signifying whether the data in each word stem from data bus 12 or data bus 63. For example, the added bit can simply be a "1" if the master clock is high, and a "0" if the slave clock is high, whereby when the multiplexer 70 selects and delivers a word from the data bus 12 to the data bus 71 it also delivers an added "1" bit thereto and when the multiplexer selects and delivers a word from the data bus 63 to the data bus 71 it also delivers an added "0" bit thereto. Accordingly, upon delivery to the FIFO Stack 80, encoded words corresponding to coincident interrupts $C_1, C_2, \ldots C_N$ are tagged with an added "1" bit whereas encoded words corresponding to exclusive interrupts $E_1, E_2, \ldots E_M$ are tagged with an added "0" bit.

The writing vs. not writing into the FIFO Stack 80 of each word instantaneously present (one word at a time) in the data bus 71 must be controlled as to timing. Thus, for instance, if no new mutually exclusive interrupt signal has arrived since the last one, then the data in bus 71 will nevertheless repeatedly carry, during every "high" phase of the master-slave clock, the encoded word corresponding to the last mutually exclusive interrupt because of inherent memory of the encoder 60. (Similarly for the encoder 11.) Accordingly, to avoid spurious repeated writing of such words into the Stack, the Write Control terminal W of the FIFO Control Unit 40 is arranged to enable writing into the Stack 80 of the data instantaneously present in the bus 71 if but only if the output of the OR gate 30 is "high", i.e., if and only if the OR gate 30 is then sending a "1" bit on its output line 31 to this control unit 40. Thus, for control over writing of words $W_1, W_2, \ldots W_M$ corresponding to the mutually exclusive interrupt signals $E_1, E_2, \ldots E_M$ into the FIFO Stack 80, the FIFO Control Unit 40 is arranged to send a separate write signal on FIFO Write line 41 to the FIFO Stack 80 once during each above-mentioned pre-selected time slot or edge within each "high" phase of the master clock sequence $\phi_{MS}$ provided that the signal bit on line 31 is then high ("1"), i.e., is then indicating the generation of a fresh mutually exclusive interrupt signal. Thus it is important that the mutually exclusive interrupt signals $E_1, E_2, \ldots E_M$ are valid during every such pre-selected time slot or edge (corrected for delays in propagation to the multiplexer 70 and to the FIFO Control Unit 40). Moreover, for control over writing of words $w_1, w_2, \ldots w_N$ corresponding to the non-mutually exclusive interrupt signals $C_1, C_2, \ldots C_N$, the FIFO Control Unit is arranged to send a separate write signal on FIFO Write line 41 to the FIFO Stack 80 once during each above-mentioned pre-selected time slot or edge within each "high" phase of the slave clock sequence $\phi_{SL}$ provided that the signal bit on line 31 is then high ("1"), i.e., is then indicating the presence of a fresh non-mutually exclusive interrupt signal, as described more fully below.

During operation, all cells (1), (2), ... (N) in the ring counter 20 contain and deliver a "0" bit except for a single cell that momentarily contains a "1" bit, which is shifted by one cell at the beginning of each period t-- -e.g., is shifted from the (i-1)'th to the i'th cell-- -regardless of the set (Q=1) vs. reset (Q=0) conditions of the R-S latches $L_1, L_2, \ldots L_N$. That is, each shift from, say, cell (i-1) to cell (i) occurs regardless of the arrivals of the coincident interrupt signals $C_1, C_2, \ldots C_N$ during the immediately past period of time T=Nt prior to each such shift of the "1" bit in the ring counter, as is known in the ring counter art. Thus, the ring counter 20 enables the encoder 11 to deliver a new encoded word, say $w_i$, to the data bus 12 and hence to the multiplexer 70 during each slave phase ($\phi_{SL}=1$) when the multiplexer samples the data bus 12.

Note that the "1" signal is delivered in sequence from successive ones of the cells (1), (2), ... N of the ring counter 20 via AND gates 121, 122, ... during successive master phases ($\phi_{MS}=1$) to the Reset terminals of corresponding ones of the R-S latches $L_1, L_2, \ldots$ N. Therefore, in response to a "1" signal from the i'th cell of the ring counter, during slave phases the Write Logic 200 enables writing into the FIFO Stack 80 of the corresponding word $w_i$ by virtue of a "1" signal on the control line 31 only if the corresponding latch $L_i$ is then in the set condition (Q=1) and hence delivers a "1" signal to the OR gate 30 through the i'th one of the AND gates 131, 132, ..., which is then being enabled by the "1" signal from the ring counter 20, and through the i'th one of the AND gates 151, 152, ..., which is then being enabled by a high signal from the slave clock sequence ($\phi_{SL}=1$)--i.e., only if the corresponding one of the coincident interrupt signals $C_1, C_2, \ldots C_N$ has arrived via AND gates 111, 112, ... and thereby has set (Q=1) the corresponding latch since the last occasion on which the latch was reset (Q=0) on a master phase ($\phi_{MS}=1$) by the "1" signal from the ring counter 20. Otherwise, in the absence of such generation of the corresponding one of the coincident interrupt signals, the Write Logic Unit receives a "0" bit along line 31 and hence does not enable the writing of the corresponding word $w_i$ into the FIFO Stack 80. Thus the word $w_i$ is written into the Stack 80 if and only if the corresponding coincident interrupt signal $C_i$ has arrived during the immediately preceding time interval T=Nt, as is desired for proper operation.

The Read control terminal R of FIFO Stack 80 is connected to cause the stack to deliver words thus stored in it to an interrupt register 90 via data bus 81, and the interrupt register is connected to deliver each of these words to a target synchronous microprocessor 100 via data bus 91, as more fully described below. To this end, the Read control terminal R of the FIFO Control Unit 40 is connected for delivering a read signal on FIFO read line 42 to the FIFO Stack 80. In addition, the FIFO Stack 80 is connected for delivering an overflow signal via datum line 82 to an added overflow latch OVF located in the interrupt register 90 in cases of overflow in the stack--i.e., in cases where so many words have been delivered into the Stack 80 in excess of words delivered by the Stack to the microprocessor that the storage capacity of the Stack is exceeded. If an overflow occurs, then on the very next machine interrupt "read" command signal, delivered on a control line 105 by microprocessor 100 to the FIFO Control Unit 40, the microprocessor 100 will thus be able to detect the occurrence of the overflow, as more fully described below.

The FIFO Stack 80 is connected so as to be able to deliver its contents, one word at a time, via a data bus 81 to an interrupt register 90, as well as to deliver the overflow signal via a datum line 82 to the added overflow latch OVF located in the register 90, as more fully described below. The interrupt register 90 is connected so as to be able to deliver its (one-word) contents via a data bus 91 to the target synchronous microprocessor 100, as well as to deliver the (one-bit) contents of the overflow latch OVF via a datum line 92 to the microprocessor 100, as more fully described below. The data bus 91 and the datum line 92 can, of course, be physically incorporated into a single bus, as known in the art.

The microprocessor 100 is operated synchronously in response to a machine clock pulse sequency $\psi$, as known in the art. If an overflow occurs in the Stack 80--i.e., if so many words have been delivered into the Stack in excess of the number of words delivered by the Stack to the interrupt register 90 that the storage capacity of the Stack is exceeded--then the overflow latch receives a one-bit signal on the line 82 from the Stack 80 (or alternatively from the Control Unit 40) indicating such overflow; hence the microprocessor 100 will thus be able to detect such an overflow by virtue of the overflow latch OVF, via datum lines 82 and 92, in response to the "read" command signal on line 105 from the microprocessor, as described more fully below.

The FIFO Control Unit 40 is connected to deliver "read" control signals to the FIFO Stack 80 and to the interrupt register 90, respectively, via control lines 42 and 44. The FIFO Control Unit 40 is also connected to deliver an interrupt signal $\overline{INTR}$ to the microprocessor 100 via line 43: when line 43 carries an $\overline{INTR}$ signal that is low (logic level "0"), it signifies an outstanding interrupt word in the FIFO Stack which has not yet been processed by the microprocessor. Moreover, the FIFO Control Unit 40 is further connected to receive a "read" command signal, via control line 105, from (and generated by) the microprocessor 100. More specifically, the microprocessor 100 is connected via the control line 105 to deliver the "read" command signal to the FIFO Control Unit 40 whenever the microprocessor is ready to receive a new interrupt word. In response thereto, if the Stack is not empty (as sensed by the FIFO Control Unit, as known in the art), then the FIFO Control Unit 40 generates and the Stack 80 receives a "read" signal on line 42, and the interrupt register 90 receives a first control signal on a control line 44 from the FIFO Control Unit 40, whereby the interrupt register is enabled to receive a fresh word from the Stack 80 via data bus 81 and to deliver this fresh word to the microprocessor 100 via data bus 91. At the same time, the overflow latch OVF delivers its own (one-bit) contents to microprocessor. On the other hand, the interrupt register 90 is designed so that, if the Stack 80 is empty, then the interrupt register receives a second control signal (different from the first control signal) on the control line 44 from the FIFO Control Unit 40, which causes the interrupt register 90 to generate and to deliver to the microprocessor 100 a unique code word $w_0$, pre-selected so as to be different from all the other interrupt words, via the data bus 91; and further, if the Stack is empty, the FIFO Control Unit 40 sets the $\overline{\text{INTR}}$ signal (interrupt signal absent) on the control line 43 to a high logic level ($\overline{\text{INTR}}=1$). Accordingly, if the microprocessor attempts to read the interrupt register in the presence of the $\overline{\text{INTR}}$ signal on the control line 43, the unique word $w_0$ will be delivered via the bus 91 from the interrupt register to the microprocessor indicating that the Stack is empty. Thus the word $w_0$ indicates to the microprocessor that all outstanding interrupt words have been processed by the microprocessor and thus can supply a "sanity" check on the validity of the $\overline{\text{INTR}}$ signal on the control line 93, as more fully described below.

At least two different modes of operation of the microprocessor are thus enabled by the use of the unique word $w_0$ signifying an empty Stack. In a first mode of operation, the microprocessor periodically reads the interrupt register by periodically sending a command signal via line 105 to the FIFO Control Unit, the $\overline{\text{INTR}}$ signal on the line 43 being disregarded by the microprocessor, or alternatively the line 43 itself being removed or discarded from the arrangement entirely. In a second mode of operation, the microprocessor sends a command signal on line 105 to the FIFO Control Unit if and only if the microprocessor is ready to receive a fresh interrupt word for processing and at the same time the $\overline{\text{INTR}}$ signal on the control line 43 is absent (i.e., Stack is not empty), whereby the delivery of the unique word $w_0$ thus serves as a "sanity" check on the correctness of the $\overline{\text{INTR}}$ signal on the line 43--i.e., serves as a check in case the signal on the line 43 is spuriously absent (low), spuriously indicating a non-empty Stack, or in case the microprocessor incorrectly interpreted (decoded) the $\overline{\text{INTR}}$ signal on the line 43 as being absent (low) and hence spuriously attempted to read the Stack.

Figure 2:
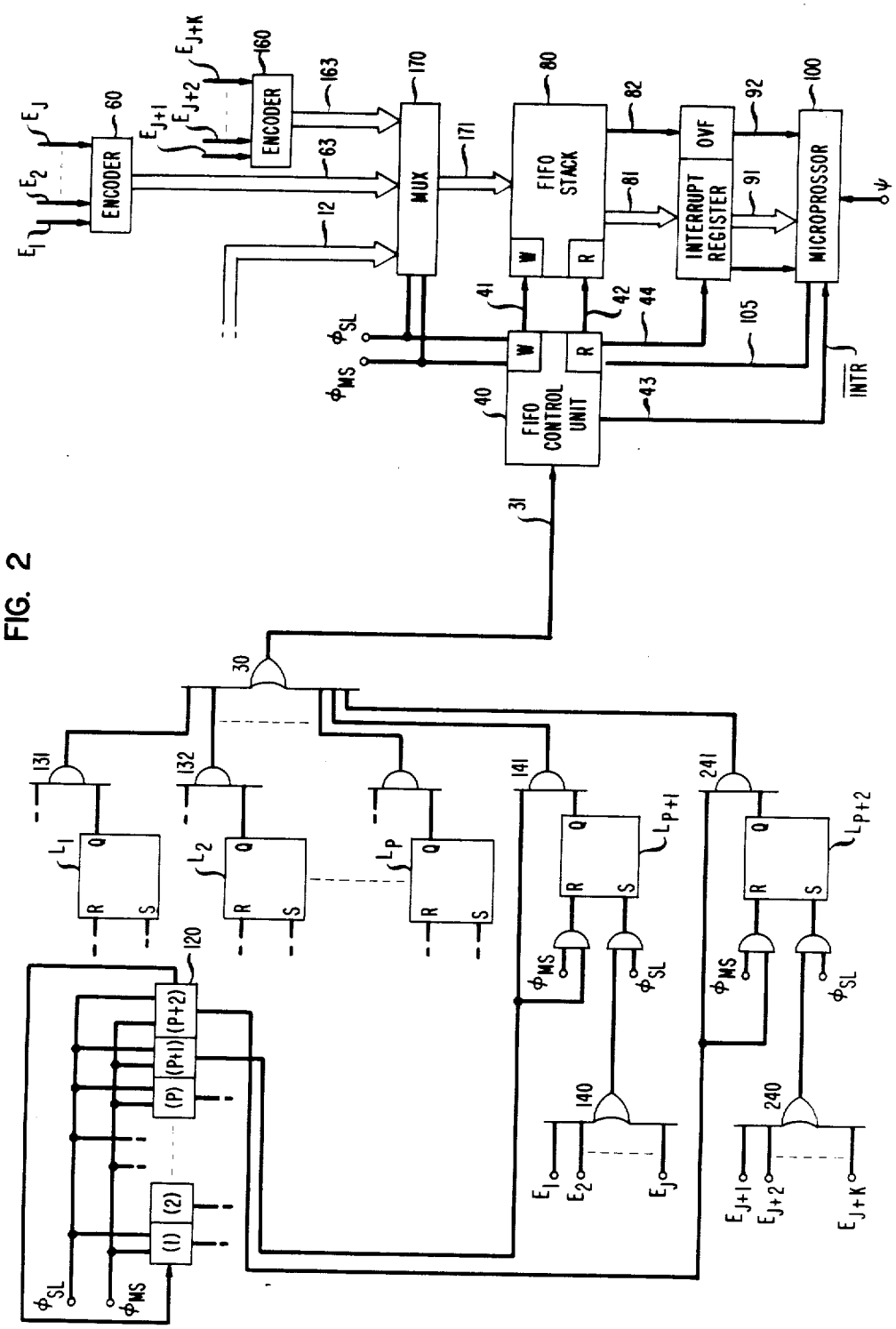
FIG. 2 is a diagram of an interrupt controller arrangement in accordance with another specific embodiment of the invention, with portions thereof that are similar to those depicted in FIG. 1 having been omitted as indicated by dotted line interconnections.

Although the invention has been discussed in detail in terms of a specific embodiment, various modifications are possible without departing from the scope of the invention. For example, as indicated in FIG. 2, some of the incoming coincident interrupt signals may be taken out of the coincident set and placed into an added, third set whereby this third set contains mutually exclusive interrupt signal within itself (although not necessarily mutually exclusive when considered together with the signals of the original set of mutually exclusive signals), whereby in general there are two sets of mutually exclusive interrupt signals, one consisting of J interrupt signals $E_1, E_2, \ldots E_J$, and the other consisting of K interrupt signals $E_{J+1}, E_{J+2}, \ldots E_{J+K}$; and thus the number of coincident signals is correspondingly reduced. It should be noted that in FIG. 2 the dotted interconnection lines indicate connections to portions (not shown) of the arrangement that are similar to those depicted in FIG. 1. In such a case, furthermore, the ring counter 120 is arranged to count modulo P+2, where P (with P<N) is the number of remaining coincident signals, and the number of latches array of R-S latches for these coincident signals is reduced from N to P. In such a case, moreover, an extra encoder 160, together with its data bus 163, is added for encoding the interrupt signals of the added set and for delivering the resulting encoded words to a multiplexer 170 (FIG. 2) which is a modified form of the multiplexer 70 (FIG. 1), in order to multiplex incoming data from the three data buses 12, 63 and 163 onto data bus 171 for delivery to the FIFO Stack 80. For this purpose this multiplexer 170 is connected (not shown) to the ring counter 120 so that, for example, for each P+2 successive periods each of duration equal to t, the following happens: during the first P periods t the data bus 12 is sampled by the multiplexer 170 once during each of the corresponding P slave phases, during the (P+1)st period t the data bus 63 is sampled by the multiplexer 170 once during the slave phase, and during the (P+2)nd period the data bus 163 is sampled by the multiplexer 170 during the slave phase. Also, the Write Logic Unit 200 (FIG. 1) is modified as indicated in FIG. 2, essentially by adding latches $L_{P+1}$ and $L_{P+2}$ for recording the occurrences of interrupt signals $E_1, E_2, \ldots E_J$ and $E_{J+1}, E_{J+2}, \ldots E_{J+K}$, respectively, in the two sets of mutually exclusive signals, and by adding AND gate 241. Thus the multiplexer 170 cooperates with the Write Logic Unit, to deliver the interrupt words via the data bus 171 to the FIFO Stack 80 and to deliver a control signal through line 31 to the FIFO Control Unit 40 corresponding to the generation vs. no generation of the corresponding interrupt signal. Note that in this way the interrupt signals $E_1, E_2, \ldots E_J, E_{J+1}, E_{J+2} \ldots E_{J+K}$ in the mutually exclusive sets are advantageously valid during the slave phases in order to set the corresponding latch $L_{P+1}$ or $L_{P+2}$ whenever such signals are generated (i.e., go high), and each such interrupt signal should be mutually exclusive with respect to itself and all the others in its own set over every time interval of duration equal to the scanning period T=(P+2)t.

Alternatively, the ring counter can be designed so as to send its high signal to the latches in the following order of sequence: $L_1, L_{P+1}, L_{P+2}, L_2, L_{P+1}, L_{P+2}$, etc., and correspondingly the multiplexer 170 is designed to sample in succession: one word from the data bus 12, one word from the data bus 63, one word from the data bus 163, another word from the data bus 12, one word from the data bus 63, one word from the data bus 163, etc. In this way, the minimum allowed time between generations of successive interrupt signals in a given mutually exclusive set is reduced to 3t at the expense of a somewhat longer minimum time between allowed successive generations of a given interrupt signal in the coincident set. Such an arrangement thus assigns equal priority to all the interrupt signals of the mutually exclusive sets. Other priority arrangements can be implemented for the mutually exclusive sets whereby certain sets are thus accessed more often by the ring counter than others.

Further subdivision of the interrupt signals into still more sets, by taking still more of the signals from the coincident set and placing them into still more mutually exclusive sets may also be feasible for some interrupt signals depending upon their mutual exclusivity relationships. In this way, the scanning period T can be still further reduced. Finally, each of the encoders is typically a read only memory (ROM), but instead of ROM a PLA can be used especially in case the incoming signals already have been encoded (though not encoded in the way that is ultimately desired for delivery to the microprocessor). Here PLA means a programmed logic array containing an AND plane (Decoder) and an OR plane (ROM). Such a ROM or PLA may well have an output register (array of latches) for temporarily storing its encoded output words, but the number of latches that such a register requires is equal to only about $\log_2 M$ where M now denotes the number of independent (perhaps already encoded) incoming interrupt signals to the ROM or PLA, as known in the binary encoding art.

What is claimed is:

1. In a data processing system, an interrupt controller arrangement comprising:
   (a) first and second encoding means respectively for generating first and second sets of encoded words corresponding to individual interrupt signals contained in first and second sets of interrupt signals, respectively, the first set of interrupt signals consisting of interrupt signals no two of which can occur simultaneously, and the second set containing at least two interrupt signals that can occur simultaneously;
   (b) a memory stack; and
   (c) multiplexing means for receiving the encoded first and second interrupt words from the first and second encoding means and for delivering to the memory stack during each time interval, of a prescribed sequence of time intervals, one of the encoded first words or one of the encoded second words depending upon the time interval.

2. The system of claim 1, further comprising write logic means for enabling the memory stack to be written with whichever word is being delivered to the stack by the multiplexing means during each such time interval if the corresponding interrupt signal has occurred within a prescribed amount of time prior to the time interval, including a separate latching means for recording the occurrences of each interrupt signal of the second set.

3. The system of claim 2, further comprising sources of the first and second groups of interrupt signals.

4. The system of claim 3, further comprising a synchronous microprocessor for receiving the encoded words from the memory stack.

5. The system of claim 1, further comprising sources of the interrupt signals of the first and second sets.

6. A data processing system comprising:
   (a) sources of first and second sets of interrupt signals, each of the signals being generated in response to the occurrence of a corresponding event in one of first and second sets of events, respectively, the first set consisting of events no two of which can occur simultaneously, and at least one of the interrupt signals of the second set being asynchronous with respect to the remaining signals of the second set;
   (b) first and second encoding means respectively for generating first and second sets of encoded words corresponding to individual ones of the interrupt signals of the first and second sets, respectively
   (c) a memory stack;
   (d) multiplexing means for receiving the encoded interrupt words of the first and second sets of words from the first and second encoding means and for alternatively delivering to the memory stack during each time interval of a prescribed sequence of time intervals an encoded word either of the first set or of the second set of encoded words depending upon the time interval; and
   (e) write logic means, including an array of latches, a separate latch for each interrupt signal of the second set of interrupt signals, each of the latches arranged for receiving and recording the occurrences of a different one of the interrupt signals of the second set of interrupt signals, said write logic means for enabling writing into the memory stack whatever word is being delivered to the stack by the multiplexing means during each such time interval if the corresponding interrupt signal has occurred since the last occasion that such word was delivered to the stack by the multiplexing means.

7. A data processing system comprising an interrupt controller arrangement including
   (a) a memory stack;
   (b) first and second data buses;
   (c) multiplexer means for delivering encoded to the memory stack alternately taken from the first and second data buses;
   (d) first and second encoders for delivering the encoded words encoded from first and second sets of words, respectively, to the first and second data buses, respectively, each word of the first and second sets representing respectively a corresponding interrupt signal, in which no two signals corresponding to the first set of words can occur simultaneously and in which the signals corresponding to the second set of words occur asynchronously with respect to each other; and
   (e) write logic for enabling the memory stack to be written with the encoded words being delivered to it by the multiplexer means if the corresponding interrupt signal has occurred within a prescribed period of time earlier and otherwise disabling the stack from being written.

* * * * *